Figure 1:
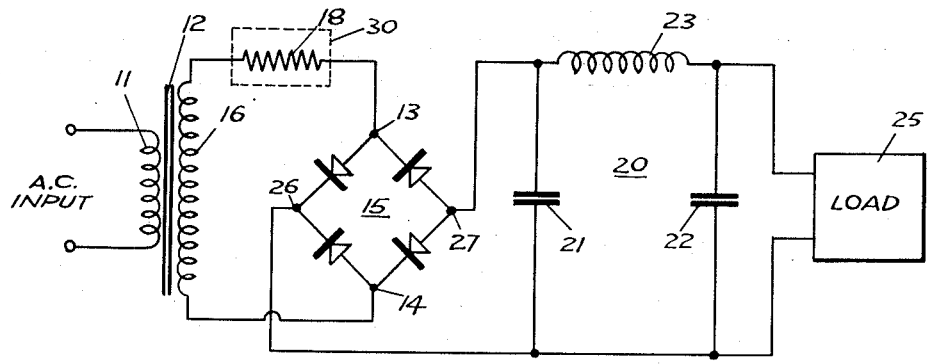

May 27, 1958     T. A. O. GROSS     2,836,784

POWER SUPPLY

Filed May 26, 1953

INVENTOR
THOMAS A. O. GROSS
BY *Elmer J. Gorn*
ATTORNEY

2,836,784
POWER SUPPLY

Thomas A. O. Gross, South Lincoln, Mass., assignor to Raytheon Manufacturing Company, Newton, Mass., a corporation of Delaware Application May 26, 1953, Serial No. 357,479

4 Claims. (Cl. 321—16)

This invention relates to a temperature compensated power supply.

In rectifying systems, including a rectifier of the dry metal compound or contact type whose input terminals are connected across an alternating current source and whose output terminals are connected to a load in series with a filter, reasonably constant voltage may be obtained provided the temperature of the circuit components remain fixed. It has been found, however, that the output voltage of rectifying systems utilizing selenium or copper oxide rectifiers varies considerably with changes in temperature owing to the negative temperature coefficient of resistance of both the rectifier and the electrolytic capacitive elements of the filter. In some applications, the rectifier must operate over a temperature range of over one hundred degrees and, consequently, the output voltage of conventional rectifier power supplies will drop to a relatively low value at low ambient temperatures and rise as the temperature increases.

Prior attempts to compensate for temperature variations involve the use of either a choke input filter, a high resistance choke with a large positive temperature coefficient of resistance, or reactance compensation. These methods, however, are unsatisfactory. A choke input filter involves an impracticable increase in the size of the filter components required. A high resistance filter choke requires an unduly large rectifier because of the large voltage drop across the choke. Variations in the frequency of the alternating current supply rule out reactance compensation.

In accordance with this invention, a compensating resistor having a positive temperature coefficient of resistance is inserted between the alternating current source and the rectifier input terminals.

Pre-rectifier compensation offers advantages over existing forms of post-rectifier compensation. The size of the rectifier may be materially reduced with pre-rectifier compensation by avoiding large voltage drops and the consequent large power loss following the rectifier. In addition, the voltage rating of a rectifier using pre-rectifier compensation may be further reduced owing to the fact that the compensating resistor reduces the voltage applied to the rectifier when the latter is hot. While the voltage applied to the rectifier when the resistor and rectifier is cold is higher, this is not embarrassing to the rectifier inasmuch as rectifiers of the selenium and copper oxide type can operate with high inverse voltages at low ambient temperatures.

Because of the positive temperature coefficient of resistance of the compensating resistor, the tendency of the voltage to decrease with increasing temperature, due to the negative temperature coefficient of resistance of the rectifier and filter, is eliminated. The voltage drop across the compensating resistor which, of course, is dependent upon the magnitude of the resistor, as well as upon the temperature coefficient of resistance of the resistor, determines the voltage available at the output of the rectifier.

Furthermore the thermal inertia of each element of the rectifying system must be taken into account in obtaining proper temperature compensation. Thermal inertia is directly proportional to both the specific heat of the circuit element and the mass of said element and is a measure of the ability of the element to absorb heat or a measure of the time required for each element to reach thermal equilibrium (that condition in which the amount of heat energy flowing into the element equals the amount of heat energy emanating therefrom). The thermal inertia, therefore, at least partially determines the temperature of the system just after power is applied, as well as the time required for the temperature of the corresponding element to reach a constant value for a given ambient temperature. This, in turn, affects not only the starting voltage but also the time necessary for the voltage to become stabilized, assuming the operating temperature itself does not change. In order to obtain a substantially flat voltage versus time characteristic, the compensating resistor has been so designed that the thermal inertia is substantially equal to the overall thermal inertia of the remainder of the rectifying system.

If the thermal inertia of the compensating resistor is low, that is, if the product of specific heat and mass is low, thermal equilibrium between the compensating resistor and the ambient region in space in which the equipment is situated is more rapidly obtained. If the thermal inertia of the resistor is too low with respect to that of the remainder of the rectifying system, however, over-compensation for temperature may result and the voltage will change too rapidly for a sudden temperature variation. The value of thermal inertia necessary to minimize starting transients is determined empirically.

The compensating resistor is preferably made in the form of a bifilar wound coil in order to render it insensitive to fluctuations in frequency of the alternating current supply. The conductance of the heat path between the compensating resistive coil and the chassis is made sufficiently high to prevent changes in output voltage after prolonged periods of operation.

Figure 2:
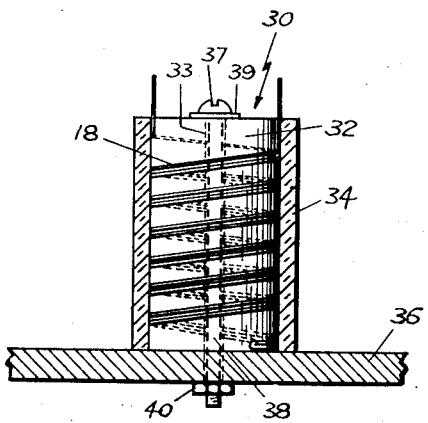

A better understanding of this invention may be had by reference to the following description taken in conjunction with the accompanying drawings in which:

Fig. 1 is a circuit diagram illustrating one form of rectifying system in accordance with the invention; and Fig. 2 illustrates one form of a compensating resistor used in the circuit of Fig. 1.

Referring to the drawing, an alternating current to be rectified is applied to the primary winding 11 of a transformer 12. The input terminals 13, 14 of a well-known bridge type full wave rectifier 15 are connected to opposite ends of the secondary winding 16 of transformer 12 in series with a compensating resistor 18, whose characteristics will be set forth subsequently. A smoothing condenser-input filter network 20, comprising a pair of capacitors 21 and 22 and a choke 23, is connected to the output terminals 26, 27 of rectifier 15. The filter network shown is merely illustrative and other types of filters may be used, if desired. Because of the high capacitance required, however, capacitors 21 and 22 are preferably of the electrolytic type whose capacitance is directly dependent upon temperature. The filtered output of filter network 20 is connected to a load 25 which may, for example, be the heater of a magnetron or some other substantially constant current device.

The compensating resistor assembly 30, as shown by way of example in Fig. 2, consists of a bifilar wound resistive coil 18 which may be of any material having a relatively large positive temperature coefficient of resistance, such as copper or brass. Because of the bifilar winding, the inductive reactance is negligible and the impedance is purely resistive. Since the resistance of the compensating resistive coil is quite low, being of the order of a few ohms, the effect of distributed capacitance of the bifilar winding is negligible.

Coil 18 is wound about a spool 32 of electrically insulating material, such as plastic or ceramic, containing a cylindrical bore 33. The wound spool may then be potted in a plastic substance in a form of a cylinder 34 of lower melting point than the material of which the spool is constructed. Cylinder 34 retains the turns of the coil in position and protects the coil from moisture and injury. The ends of resistor 18 are adapted to be connected to the rectifier input circuit of Fig. 1. The cylindrical potted portion of the resistor assembly may be omitted, if desired, without substantially affecting the operation.

The resistor assembly 30 is mounted on a conventional metallic chassis 36 by a thermally conductive fastening device 38 which is inserted through the bore 33 in spool 32. As shown in Fig. 2, the fastening device consists of a bolt 38 having a head portion 37 which engages a washer 39. The washer, in turn, rests against the upper surface of the spool. Bolt 38 is receptive of a nut 40 which engages the bottom of chassis 36. The bore 33 of spool 32 may, of course, be threaded to receive a fastening device in the form of a screw.

Bolt 38, which is thermally conductive, forms an effective path for the transfer of heat between the resistive coil and the chassis.

The mass of the copper or brass coil 30, which is made of fine wire, is relatively low, as also is the specific heat. The thermal inertia of the compensating resistor therefore is relatively small. By equating this thermal inertia with that of the remainder of the rectifying system, including the load, short time drifts which occur during the first minute or so after cold starts may be substantially reduced and the output voltage will remain substantially constant at all times.

One convenient way to arrive at an appropriate thermal inertia is to adjust the wire size. For example, a resistance of four ohms can be developed at 20° C. with ninety-eight feet of gauge 26 copper wire or with three hundred and ninety-five feet of gauge 20 copper wire. Assuming the use of identical spools in the same quality and quantity of impregnant, the mass and, therefore, the thermal inertia of the 20 gauge resistive coil would be about sixteen times larger than that of the 26 gauge coil.

In one application of this invention, the output voltage applied to a magnetron heater was held between 6.4 volts and 6.0 volts between −55° C. and −85° under both cold start and steady state conditions. In this particular application over-compensation was purposely provided in order to supply additional magnetron heater power at the lower limit of temperature. By increasing slightly the thermal inertia at the resistor, that is, by increasing either the mass or the specific heat or both, the over-compensation may be reduced and the voltage held at substantially six volts throughout operation. The same rectifying system, without compensation for temperature, was characterized by a magnetron heater voltage variation of from 3.6 volts one minute after cold start at −55° C. to 6.3 volts at 85° C. steady state.

The voltage drop across compensating resistor 18, and hence the voltage available at the output of rectifier 15, is a function of the magnitude of the resistance, at a given temperature. The larger the nominal resistance of compensating resistor 18, the greater will be the voltage drop across said resistor and the less will be the voltage available at the load. It is also possible to increase the output voltage by increasing the alternating current input voltage.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In combination, a rectifier having an input circuit connected across a source of alternating current voltage and an output circuit connected to a load, said rectifier having a negative temperature coefficient of resistance, a resistor connected in said input circuit of said rectifier, said resistor having a positive temperature coefficient of resistance and a thermal inertia substantially equal to that of said rectifier.

2. In combination, a rectifier whose temperature coefficient of resistance is negative, said rectifier including an input circuit connected across a source of alternating current voltage and an output circuit, a filter circuit connected to said rectifier output circuit and having a negative temperature coefficient of resistance, a load connected to said filter circuit, and a resistor connected in series with said rectifier input circuit, said resistor having a positive temperature coefficient of resistance and thermal inertia substantially equal to that of the combination of said rectifier and said filter element.

3. In combination, a rectifier whose temperature coefficient of resistance is negative, said rectifier including an input circuit connected across a source of alternating current voltage and an output circuit, a filter circuit connected to said rectifier output circuit and having a negative temperature coefficient of resistance, a load connected to said filter circuit, and a resistor connected in series with said rectifier input circuit, said resistor having a positive temperature coefficient of resistance and a thermal inertia substantially equal to that of the combination of said rectifier and said filter element.

4. In combination, a rectifier whose temperature coefficient of resistance is negative, and including an input circuit connected across a source of alternating current voltage and an output circuit, a filter circuit connected to said rectifier output circuit and including at least one element whose temperature coefficient of resistance is negative, and a resistor inserted between said source and said rectifier input circuit and in series therewith, said resistor having a positive temperature coefficient of resistance and a thermal inertia substantially equal to that of the combination of said rectifier and said filter element.

References Cited in the file of this patent

UNITED STATES PATENTS

| | | |
|---|---|---|
| 2,061,227 | Edward | Nov. 17, 1936 |
| 2,067,604 | Godsey | Jan. 12, 1937 |
| 2,170,193 | Godsey | Aug. 22, 1939 |
| 2,413,033 | Potter | Dec. 24, 1946 |
| 2,594,801 | Rees | Apr. 29, 1952 |
| 2,611,118 | Havlick | Sept. 16, 1952 |

FOREIGN PATENTS

| | | |
|---|---|---|
| 228,109 | Great Britain | May 28, 1925 |
| 569,049 | Great Britain | May 2, 1945 |